United States Patent
Komatsu

(12) 
(10) Patent No.: US 6,307,599 B1
(45) Date of Patent: Oct. 23, 2001

(54) ANALOG-DIGITAL BROADCAST SHARED RECEIVING TUNER

(75) Inventor: Michihiro Komatsu, Soma (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/041,361

(22) Filed: Mar. 9, 1998

(30) Foreign Application Priority Data

Mar. 10, 1997 (JP) ........................................ 9-055112

(51) Int. Cl.$^7$ ........................................ H04N 5/50
(52) U.S. Cl. ................ 348/731; 348/725; 455/249.1; 455/251.1
(58) Field of Search ................ 348/725, 726, 348/731, 733; 455/249.1, 250.1, 251.1, 239.1

(56) References Cited

U.S. PATENT DOCUMENTS

| | | | |
|---|---|---|---|
| 5,483,209 | * 1/1996 | Takayama | 455/188.1 |
| 5,940,143 | * 8/1999 | Igarashi et al. | 348/678 |
| 5,974,093 | * 10/1999 | Lee | 725/297 |
| 5,999,559 | * 12/1999 | Takaki | 455/249.1 |
| 6,011,597 | * 1/2000 | Kubo | 348/725 |
| 6,037,999 | * 3/2000 | Kunishima | 348/731 |
| 6,088,569 | * 7/2000 | Bach et al. | 455/249.1 |

FOREIGN PATENT DOCUMENTS

| | | |
|---|---|---|
| 08181556 A | 7/1996 | (JP) . |
| 08274590 A | 10/1996 | (JP) . |

* cited by examiner

Primary Examiner—Reinhard J. Eisenzopf
Assistant Examiner—Trang U. Tran
(74) Attorney, Agent, or Firm—Brinks Hofer Gilson & Lione

(57) ABSTRACT

Described herein is an analog-digital broadcast shared receiving tuner for receiving therein a low-level broadcast signal of a digital broadcast assigned to a vacant channel of an analog broadcast and having first and second frequency conversion stages each comprised of a frequency mixer and a local oscillator. A variable attenuator capable of performing switching between predetermined attenuation and zero attenuation is electrically connected between an intermediate frequency amplifier for amplifying a first intermediate frequency signal outputted from the first frequency conversion stage and the frequency mixer of the second frequency conversion stage, which follows the intermediate frequency amplifier, so that the attenuation of the variable attenuator reaches zero attenuation upon reception of an analog broadcast and the attenuation thereof reaches predetermined attenuation upon reception of a digital broadcast.

3 Claims, 4 Drawing Sheets

ANALOG-DIGITAL BROADCAST SHARED RECEIVING TUNER

BACKGROUND OF THE INVENTION

1. Field of the Invention

This invention relates to an analog-digital broadcast shared receiving tuner, and particularly to an analog-digital broadcast shared receiving tuner capable of reducing the interference of a high-level analog broadcast of an adjacent channel upon reception of a low-level digital broadcast assigned to a vacant channel of an analog broadcast.

2. Description of the Related Art

In recent years, a digital broadcast came into service in a television-broadcasting field in addition to an analog broadcast which has been performed up to now.

Described specifically, a low-level digital broadcast is assigned to a vacant channel of an analog broadcast to transmit an analog-digital mixed broadcast.

Meanwhile, a double conversion type analog-digital broadcast shared receiving tuner having two frequency conversion stages so as to be able to receive a digital broadcast in a satisfactory state has been used as an analog-digital broadcast shared receiving tuner used for receiving such an analog-digital mixed broadcast.

FIG. 3 is a diagram for describing an example of a configuration of such an analog-digital mixed broadcast. FIG. 4 is a block diagram showing one example of the already-known double conversion type analog-digital broadcast shared receiving tuner.

As shown in FIG. 3, the analog-digital mixed broadcast is one represented in a signal form in which a digital broadcast channel D is assigned to a vacant channel between analog broadcast channels $A_1$ and $A_2$. The level of the digital broadcast is set so as to reach a low level of about 10 dB with respect to the level of the analog broadcast to eliminate interference with the analog broadcast.

Further, as shown in FIG. 4, the double conversion type analog-digital broadcast shared receiving tuner comprises an automatic gain control high-frequency amplifier 41, a first frequency conversion stage 42 comprised of a first frequency mixer 43 and a first local oscillator 44, a first intermediate frequency signal pass filter 45, a first intermediate frequency signal amplifier 46, a second frequency conversion stage 47 comprised of a second frequency mixer 48 and a second local oscillator 49, a second intermediate frequency signal pass filter 50, a second intermediate frequency signal amplifier 51 and a second intermediate frequency signal output terminal 52. A receiving antenna 53 is electrically connected to the input side of the automatic gain control high-frequency amplifier 41.

The analog-digital broadcast shared receiving tuner constructed as described above is roughly operated as follows:

When an analog-digital broadcast (50 MHz to 800 MHz) is received by the antenna 53, the automatic gain control high-frequency amplifier 41 effects automatic gain control amplification on the received high-frequency signal in response to a gain control voltage applied across a gain control terminal 41c and supplies the amplified signal to the first frequency conversion stage 42 subsequent to the automatic gain control high-frequency amplifier 41. In the first frequency conversion stage 42, the first frequency mixer 43 frequency-mixes the high-frequency signal into a first local oscillation signal supplied from the first local oscillator 44 and supplies the frequency-mixed signal to the first intermediate frequency signal pass filter 45 subsequent to the first frequency mixer 43. The first intermediate frequency signal pass filter 45 extracts only a first intermediate frequency signal (1 GHz as an example) from the frequency-mixed signal and supplies it to the first intermediate frequency signal amplifier 46 subsequent to the first intermediate frequency signal pass filter 45. The first intermediate frequency signal amplifier 46 amplifies the first intermediate frequency signal to a predetermined level and supplies it to the second frequency conversion stage 47 subsequent to the first intermediate frequency signal amplifier 46. In the second frequency conversion stage 47, the second frequency mixer 48 frequency-mixes the first intermediate frequency signal into a second local oscillation signal supplied from the second local oscillator 49 and supplies the frequency-mixed signal to the second intermediate frequency signal pass filter 50 subsequent to the second frequency mixer 48. The second intermediate frequency signal pass filter 50 extracts only a second intermediate frequency signal (44 MHz as an example) from the frequency-mixed signal and supplies it to the second intermediate frequency signal amplifier 51 subsequent to the second intermediate frequency signal pass filter 50. The second intermediate frequency signal amplifier 51 amplifies the second intermediate frequency signal to a predetermined level and supplies it to an available circuit (not shown) through the second intermediate frequency signal output terminal 52.

In this case, the frequency of the first local oscillation signal of the first frequency conversion stage 42 is selectively adjusted in the analog-digital broadcast shared receiving tuner so that a broadcast for one broadcast channel of the analog broadcast channels $A_1$ and $A_2$ or the digital broadcast channel D is received.

The already-known analog-digital broadcast shared receiving tuner has an advantage that the analog and digital broadcasts can be selectively received without individually providing an analog broadcast receiving portion and a digital broadcast receiving portion. However, a problem arises in that when it is desired to set the reception sensitivity of the analog broadcast by the already-known analog-digital broadcast shared receiving tuner substantially equal to the receiving sensitivity of this type (single conversion type) analog broadcast receiving tuner having one frequency conversion stage, interference components resultant from the analog broadcast adjacent to the digital broadcast channel D enter into the digital broadcast upon reception of the digital broadcast, so that the received digital broadcast is greatly degraded in quality.

SUMMARY OF THE INVENTION

With the foregoing problem in view, it is therefore an object of the present invention to provide an analog-digital broadcast shared receiving tuner capable of improving the quality of a received digital broadcast without a reduction in receiving sensitivity of an analog broadcast.

In order to achieve the above object, an analog-digital broadcast shared receiving tuner of the present invention has a variable attenuator electrically connected to the input side of a frequency mixer, which is capable of performing switching between zero attenuation and predetermined attenuation, and means for switching the attenuation of the variable attenuator to the zero attenuation upon reception of an analog television broadcast and switching the attenuation thereof to the predetermined attenuation upon reception of a digital television broadcast.

According to the means, since the attenuation of the connected variable attenuator is set so as to reach the zero attenuation upon reception of the analog television broadcast, the variable attenuator becomes equal to a non-connected state so that comparatively high receiving sensitivity can be obtained. Since the attenuation of the connected variable attenuator is set so as to reach the predetermined attenuation upon reception of the digital television broadcast, interference components resultant from the analog television broadcast, which enter into the digital broadcast received signal, are sufficiently attenuated to an interference non-allowable degree by the variable attenuator, so that the digital broadcast received signal good in quality can be obtained. Incidentally, the digital television broadcast received signal is also attenuated by the variable attenuator in the same manner as described above. However, since the digital signal can be reproduced if only binary states (such as on and off states) can be identified, the quality of the received signal is not degraded due to the attenuation of such a variable attenuator.

In an embodiment of the present invention, an analog-digital broadcast shared receiving tuner includes one frequency conversion stage comprised of a frequency mixer and a local oscillator. A variable attenuator capable of performing switching between zero attenuation and predetermined attenuation is electrically connected to the input side of the frequency mixer so that the attenuation of the variable attenuator is switched to the zero attenuation upon reception of an analog television broadcast and the attenuation thereof is switched to the predetermined attenuation upon reception of a digital television broadcast.

In a specific embodiment of the present invention, a passband variable filter is provided on the input side of a variable attenuator. A passband of the passband variable filter is varied according to the frequency of a received television broadcast.

In a preferred embodiment of the present invention, an analog-digital broadcast shared receiving tuner is equipped with first and second frequency conversion stages comprising frequency mixers and local oscillators respectively. A variable attenuator capable of performing switching between zero attenuation and predetermined attenuation is electrically connected between an intermediate frequency amplifier for amplifying a first intermediate frequency signal outputted from the first frequency conversion stage and the frequency mixer of the second frequency conversion stage following the intermediate frequency amplifier so that the attenuation of the variable attenuator is switched to the zero attenuation upon reception of an analog television broadcast and the attenuation thereof is switched to the predetermined attenuation upon reception of a digital television broadcast.

According to the embodiment of the present invention, when it is desired to receive an analog broadcast from an analog-digital mixed broadcast, an analog broadcast received signal is detected and the attenuation of the connected variable attenuator is set so as to reach zero attenuation. Therefore, the variable attenuator becomes equal to a substantially non-connected state and receiving sensitivity comparatively high to the received analog broadcast can be obtained. When it is desired to receive a digital broadcast, a digital broadcast received signal is detected and the attenuation of the connected variable attenuator is set so as to reach predetermined attenuation. Therefore, interference components resultant from the analog broadcast, which enter into the digital broadcast received signal, are sufficiently attenuated to an interference non-allowable degree under the predetermined attenuation set by the variable attenuator, so that the digital broadcast received signal good in quality can be obtained.

Incidentally, when the digital broadcast is received, the digital television broadcast received signal is also attenuated under the predetermined attenuation set by the variable attenuator in the same manner as described above. However, since the digital signal can be reproduced if only binary states (such as on and off states) can be identified, the quality of the received signal is not degraded due to the attenuation of such a variable attenuator.

In the embodiment of the present invention as well, if a variable attenuator is electrically connected between a narrow-band frequency mixer and an amplifier electrically connected to the input side thereof, then a carrier-to-noise (C/N) characteristic satisfactory for the digital broadcast received signal can be obtained.

Further, in the embodiment of the present invention, if a double conversion type analog-digital broadcast shared receiving tuner is used and a variable attenuator is electrically connected between a second frequency mixer and a first intermediate frequency amplifier electrically connected to the input side thereof, a digital broadcast received signal can be made satisfactory in quality and a carrier-to-noise (C/N) characteristic satisfactory for the digital broadcast received signal can be obtained.

Typical ones of various inventions of the present application have been shown in brief. However, the various inventions of the present application and specific configurations of these inventions will be understood from the following description.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

DETAILED DESCRIPTION OF THE PREFERRED EMBODIMENTS

Preferred embodiments of the present invention will hereinafter be described in detail with reference to the accompanying drawings.

Figure 1:
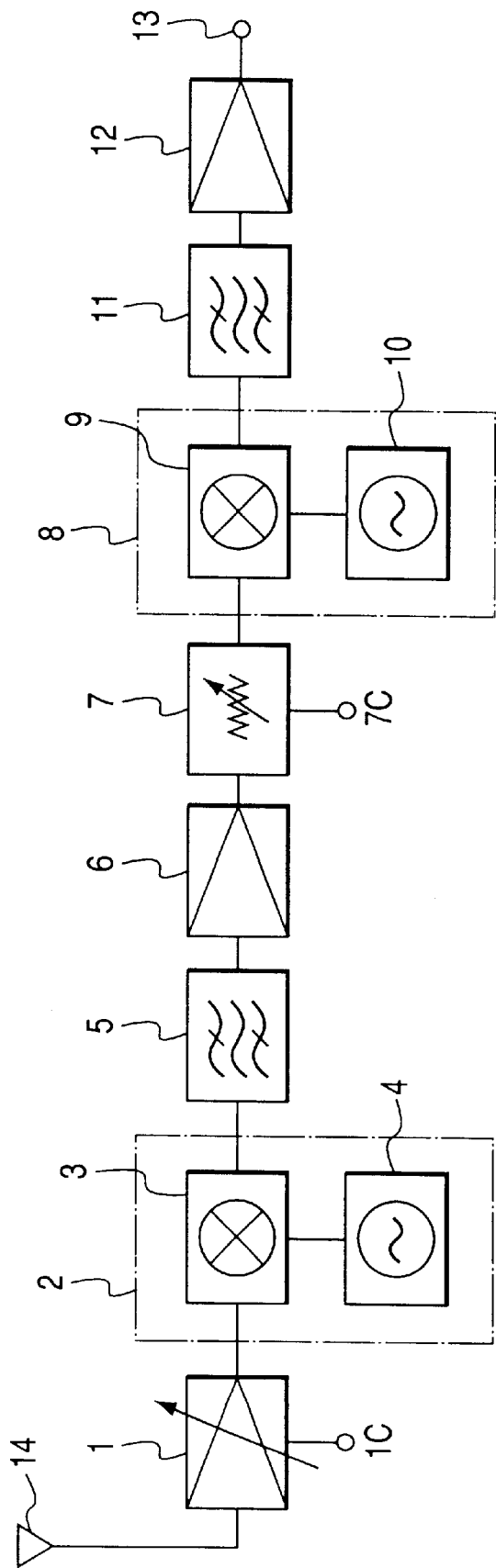
FIG. 1 is a block diagram showing a first embodiment of an analog-digital broadcast shared receiving tuner according to the present invention.

FIG. 1 is a block diagram showing a first embodiment of an analog-digital broadcast shared receiving tuner according to the present invention and illustrates an example of a double conversion type analog-digital broadcast shared receiving tuner.

As shown in FIG. 1, the double conversion type analog-digital broadcast shared receiving tuner according to the first embodiment comprises an automatic gain control (AGC) high-frequency amplifier 1, a first frequency conversion stage 2 comprised of a first frequency mixer 3 and a first local oscillator 4, a first intermediate frequency signal pass filter 5, a first intermediate frequency signal amplifier 6, a variable attenuator 7, a second frequency conversion stage 8 made up of a second frequency mixer 9 and a second local oscillator 10, a second intermediate frequency signal pass filter 11, a second intermediate frequency signal amplifier 12 and a second intermediate frequency signal output terminal 13. A receiving antenna 14 is electrically connected to the input side of the automatic gain control high-frequency amplifier 1.

In this case, the automatic gain control high-frequency amplifier 1 performs automatic gain control on a high-frequency signal to be amplified, in response to a gain control signal supplied to a gain control terminal 1c thereof. The variable attenuator 7 sets the switching of attenuation between predetermined attenuation (e.g., about 10 dB) and zero attenuation. Upon reception of a digital broadcast, the variable attenuator 7 sets switching to the predetermined attenuation in response to a first gain setting signal applied to a gain setting terminal 7c thereof. Upon reception of an analog broadcast, the variable attenuator 7 sets switching to the zero attenuation in response to a second gain setting signal supplied to the gain setting terminal 7c in the same manner as described above.

Figure 4:
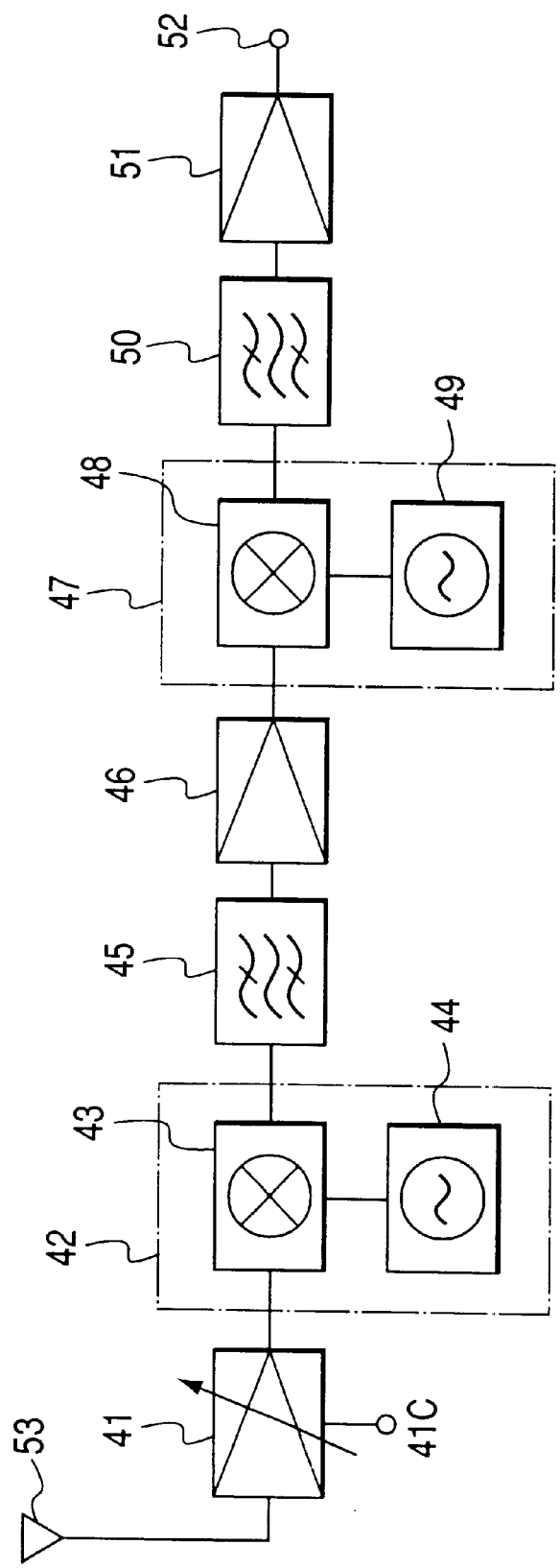
FIG. 4 is a block diagram showing an example of a known double conversion type analog-digital broadcast shared receiving tuner.

Incidentally, the difference in configuration between the double conversion type analog-digital broadcast shared receiving tuner (former) according to the first embodiment and the already-known double conversion type analog-digital broadcast shared receiving tuner (latter) shown in FIG. 4 is as follows: In the former, the variable attenuator 7 is inserted and connected between the second intermediate frequency signal amplifier 12 and the second frequency mixer 9. On the other hand, the variable attenuator 7 is not inserted and connected therebetween in the latter. The former is substantially identical in other configurations to the latter.

The analog-digital broadcast shared receiving tuner according to the first embodiment, which has been constructed in the above-described manner, is operated as follows:

If the analog broadcast is selected by a channel selector (not shown), the first local oscillator 4 generates a first local oscillation signal of a frequency corresponding to the analog broadcast selected by the channel selector. Further, the variable attenuator 7 performs an attenuation switching setting so as to exhibit the zero attenuation in response to the second gain setting signal supplied to the gain setting terminal 7c. If, on the other hand, the digital broadcast is selected by the channel selector (not shown), then the first local oscillator 4 generates a first local oscillation signal of a frequency corresponding to the digital broadcast selected by the channel selector. Further, the variable attenuator 7 performs an attenuation switching setting so as to exhibit the predetermined attenuation in response to the first gain setting signal supplied to the gain setting terminal 7c. In this case, the first gain setting signal and the second gain setting signal are derived or produced from the output or the like of a component capable of detecting whether the selected broadcast is either the analog or digital broadcast, e.g., a signal demodulator electrically connected to the second intermediate frequency signal output terminal 13.

When an analog-digital mixed broadcast (whose frequency band ranges from 50 MHz to 800 MHz) is received by the antenna 14, the automatic gain control high-frequency amplifier 1 effects automatic gain control amplification on the received signal in response to a gain control voltage applied across the gain control terminal 1c and supplies the amplified signal to the first frequency conversion stage 2 subsequent to the automatic gain control high-frequency amplifier 1 as a high-frequency signal. In the first frequency conversion stage 2, the first frequency mixer 3 frequency-mixes the high-frequency signal into the first local oscillation signal supplied from the first local oscillator 4 and supplies the frequency-mixed signal to the first intermediate frequency signal pass filter 5 subsequent to the first frequency mixer 3. The first intermediate frequency signal pass filter 5 extracts only a first intermediate frequency signal (frequency of 1 GHz as an example) from the frequency-mixed signal inputted thereto and supplies it to the first intermediate frequency signal amplifier 6 subsequent to the first intermediate frequency signal pass filter 5. The first intermediate frequency signal amplifier 6 amplifies the first intermediate frequency signal to a predetermined level and inputs it to the variable attenuator 7 subsequent to the first intermediate frequency signal amplifier 6.

Since the attenuation of the variable attenuator 7 is switched and set to the zero attenuation as described above at this time supposing that the channel selector selected the analog broadcast, the first intermediate frequency signal passes through the variable attenuator 7 at the zero attenuation and is thereafter supplied to the second frequency conversion stage 8 subsequent to the variable attenuator 7.

Since, on the other hand, the attenuation of the variable attenuator 7 is switched and set to the predetermined attenuation (e.g., about 10 dB) as described above in the case the channel selector has selected the digital broadcast, the first intermediate frequency signal undergoes the predetermined attenuation by the variable attenuator 7 and is thereafter supplied to the second frequency conversion stage 8 subsequent to the variable attenuator 7.

In the second frequency conversion stage 8, the second frequency mixer 9 thereafter frequency-mixes the first intermediate frequency signal with a second local oscillation signal supplied from the second local oscillator 10 and supplies the frequency-mixed signal to the second intermediate frequency signal pass filter 11 subsequent to the second frequency mixer 9. The second intermediate frequency signal pass filter 11 extracts only a second intermediate frequency signal (frequency of 44 MHz as an example) from the frequency-mixed signal inputted thereto and supplies it to the second intermediate frequency signal amplifier 12 subsequent to the second intermediate frequency signal pass filter 11. The second intermediate frequency signal amplifier 12 amplifies the second intermediate frequency signal to a predetermined level and supplies it to an available circuit (not shown) following the second intermediate frequency signal amplifier 12 through the second intermediate frequency signal output terminal 13.

According to the analog-digital broadcast shared receiving tuner of the first embodiment as described above, when the analog broadcast is selected and received, the attenuation of the variable attenuator 7 is automatically set to the zero attenuation. Further, since the variable attenuator 7 does not bring any signal loss on the analog broadcast received signal, comparatively high received sensitivity is obtained. When, on the other hand, the digital broadcast is selected and received, the attenuation of the variable attenuator 7 is similarly automatically set to the predetermined attenuation. Further, since the variable attenuator 7 gives a predetermined amount of signal loss to the digital broadcast received signal, interfering components resultant from the analog broadcast, which enter into the digital broadcast received signal, can be sufficiently attenuated to an interference non-allowable degree, so that a digital broadcast received signal good in quality can be obtained.

According to the analog-digital broadcast shared receiving tuner of the first embodiment as well, since the tuner is set to the double conversion type and the variable attenuator 7 is inserted and connected between the second frequency mixer 9 serving as a narrow-band frequency mixer and the first intermediate frequency amplifier 6 electrically connected to its preceding stage, a digital broadcast received signal can be made satisfactory in quality and a satisfactory carrier-to-noise (C/N) characteristic with respect to the digital broadcast received signal can be obtained.

Figure 2:
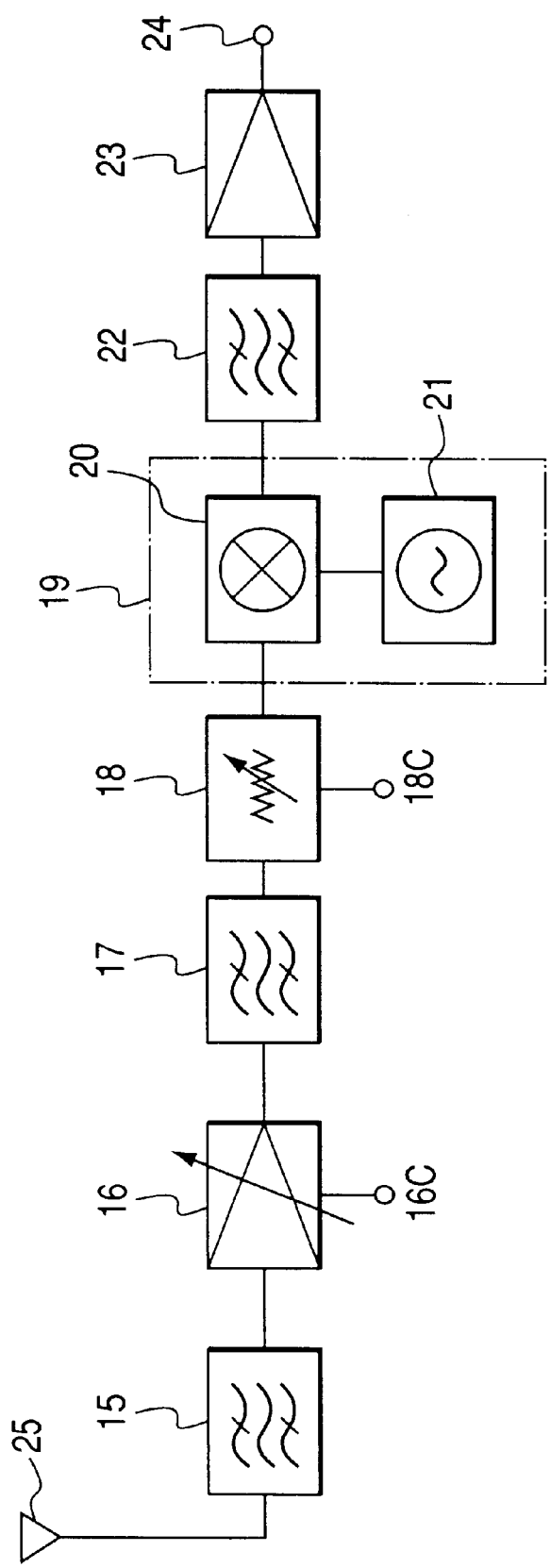
FIG. 2 is a block diagram illustrating a second embodiment of an analog-digital broadcast shared receiving tuner according to the present invention.
Figure 3:
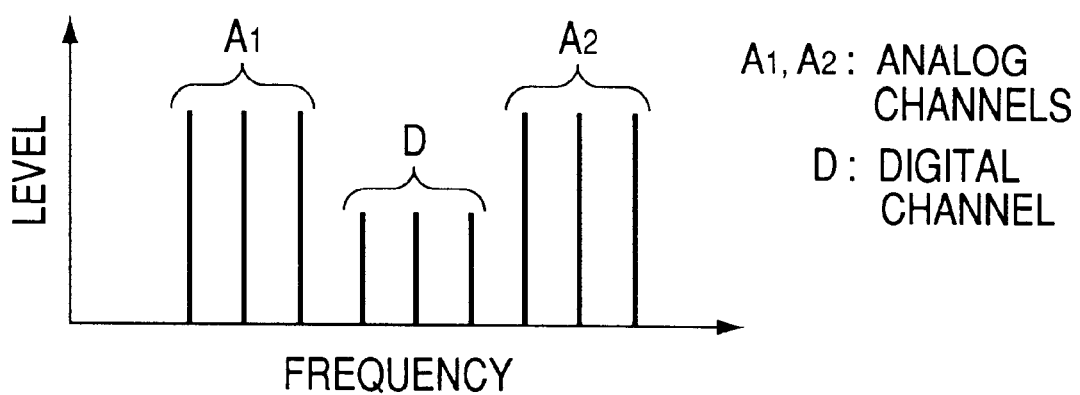
FIG. 3 is a diagram for describing an example of configurations of an analog-digital broadcast signal.

Next, FIG. 2 is a block diagram showing a second embodiment of an analog-digital broadcast shared receiving tuner according to the present invention and illustrates an example of a single conversion type analog-digital broadcast shared receiving tuner.

As shown in FIG. 2, the single conversion type analog-digital broadcast shared receiving tuner according to the second embodiment comprises a prestage-located high-frequency signal bandpass variable filter 15, an automatic gain control (AGC) high-frequency amplifier 16, a poststage-located passband variable filter 17, a variable attenuator 18, a frequency conversion stage 19 comprised of a frequency mixer 20 and a local oscillator 21, an intermediate frequency signal pass filter 22, an intermediate frequency signal amplifier 23 and an intermediate frequency signal output terminal 24. Further, a receiving antenna 25 is electrically connected to the input side of the prestage-located passband variable filter 15.

Also in this case, the automatic gain control high-frequency amplifier 16 performs automatic gain control on a high-frequency signal to be amplified, in response to a gain control signal supplied to a gain control terminal 16c thereof. The variable attenuator 18 is identical in configuration to the variable attenuator 7 employed in the first embodiment and sets the switching of attenuation between a predetermined attenuation (e.g., about 10 dB) and zero attenuation. Upon reception of a digital broadcast, the variable attenuator 18 sets switching to the predetermined attenuation in response to a first gain setting signal applied to a gain setting terminal 18c thereof. Upon reception of an analog broadcast, the variable attenuator 18 sets switching to the zero attenuation in response to a second gain setting signal supplied to the gain setting terminal 18c.

The analog-digital broadcast shared receiving tuner according to the second embodiment, which has been constructed as described above, is operated as follows:

If the analog broadcast is selected by a channel selector (not shown), the local oscillator 21 generates a local oscillation signal of a frequency corresponding to the analog broadcast selected by the channel selector. Further, the variable attenuator 18 performs an attenuation switching setting so as to exhibit the zero attenuation in response to the second gain setting signal supplied to the gain setting terminal 18c. If, on the other hand, the digital broadcast is selected by the channel selector (not shown), then the local oscillator 21 generates a local oscillation signal of a frequency corresponding to the digital broadcast selected by the channel selector. Further, the variable attenuator 18 performs an attenuation switching setting so as to exhibit the predetermined attenuation in response to the first gain setting signal supplied to the gain setting terminal 18c. Also in this case, the first gain setting signal and the second gain setting signal are derived or produced from the output or the like of a component capable of detecting whether the selected broadcast is either the analog or digital broadcast, e.g., a signal demodulator electrically connected to the second intermediate frequency signal output terminal 24.

When an analog-digital broadcast (whose frequency band ranges from 50 MHz to 800 MHz) is received by the antenna 25, the passband variable filter 15 extracts a high-frequency signal in a predetermined frequency band from the broadcast received signal and supplies it to the automatic gain control high-frequency amplifier 16 subsequent to the passband variable filter 15. The automatic gain control high-frequency amplifier 16 performs automatic gain control amplification on the high-frequency signal in response to a gain control voltage supplied to the gain control terminal 16c and supplies it to the next poststage-located passband variable filter 17. The passband variable filter 17 extracts the high-frequency signal in the predetermined frequency band from the supplied high-frequency signal again and supplies it to the variable attenuator 18 subsequent to the passband variable filter 17.

At this time, if the channel selector has selected the analog broadcast, since the attenuation of the variable attenuator 18 is switched and set to the zero attenuation as described above, the high-frequency signal passes through the variable attenuator 18 at the zero attenuation and is thereafter supplied to the frequency conversion stage 19 subsequent to the variable attenuator 18.

On the other hand, if the channel selector has selected the digital broadcast, the attenuation of the variable attenuator 18 is switched and set to the predetermined attenuation (e.g., about 10 dB) as described above. Accordingly, the high-frequency signal undergoes the predetermined attenuation by the variable attenuator 18 and is thereafter supplied to the frequency conversion stage 19 subsequent to the variable attenuator 18.

In the frequency conversion stage 19, the frequency mixer 20 thereafter frequency-mixes the high-frequency signal into a local oscillation signal supplied from the local oscillator 21 and supplies the frequency-mixed signal to the intermediate frequency signal pass filter 22 subsequent to the frequency mixer 20. The intermediate frequency signal pass filter 22 extracts only an intermediate frequency signal (frequency of 44 MHz as an example) from the frequency-mixed signal inputted thereto and supplies it to the intermediate frequency signal amplifier 23 subsequent to the intermediate frequency signal pass filter 22. The intermediate frequency signal amplifier 23 amplifies the intermediate frequency signal to a predetermined level and supplies it to an available circuit (not shown) subsequent to the intermediate frequency signal amplifier 23 through the intermediate frequency signal output terminal 24.

Incidentally, the poststage-disposed high-frequency signal pass filter 17 employed in the second embodiment is not essential and may suitably be omitted.

According to the analog-digital broadcast shared receiving tuner of the second embodiment as described above, when the analog broadcast is received, the attenuation of the variable attenuator 18 is automatically set to the zero attenuation. Further, since the variable attenuator 18 obtains comparatively high received sensitivity without bringing some signal loss to the analog broadcast received signal. When, on the other hand, the digital broadcast is received, the attenuation of the variable attenuator 18 is automatically set to the predetermined attenuation. Further, since the variable attenuator 18 gives a predetermined amount of signal loss to the digital broadcast received signal, interfering components resultant from the analog broadcast, which enter into the digital broadcast received signal, can be sufficiently attenuated to an interference non-allowable degree, so that a digital broadcast received signal good in quality can be obtained.

According to the analog-digital broadcast shared receiving tuner of the second embodiment as well, since the variable attenuator 18 is inserted and connected between the frequency mixer 20 serving as a narrow-band frequency mixer and the automatic gain control high-frequency amplifier 17 electrically connected to its preceding stage, a satisfactory carrier-to-noise (C/N) characteristic with respect to the digital broadcast received signal can be obtained.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. An analog-digital broadcast shared receiving tuner comprising:

a frequency conversion stage including a frequency mixer and a local oscillator, and a variable attenuator capable of performing switching between zero attenuation and predetermined attenuation being electrically connected to the input side of said frequency mixer, said variable attenuator being switched so that the attenuation thereof reaches the zero attenuation upon reception of an analog television broadcast and the attenuation thereof reaches the predetermined attenuation upon reception of a digital television broadcast.

2. An analog-digital broadcast shared receiving tuner according to claim 1, further comprising a passband variable filter provided on the input side of said variable attenuator and whose passband is varied according to the frequency of the received television broadcast.

3. An analog-digital broadcast shared receiving tuner comprising:

first and second frequency conversion stages each including a frequency mixer and a local oscillator, and a variable attenuator capable of performing switching between zero attenuation and predetermined attenuation being electrically connected between an intermediate frequency amplifier for amplifying a first intermediate frequency signal outputted from said first frequency conversion stage and a frequency mixer of said second frequency conversion stage which follows said intermediate frequency amplifier, said variable attenuator being switched so that the attenuation thereof reaches the zero attenuation upon reception of an analog television broadcast and the attenuation thereof reaches the predetermined attenuation upon reception of a digital television broadcast.

\* \* \* \* \*